United States Patent [19]
Schwendeman

[11] Patent Number: 5,404,684
[45] Date of Patent: Apr. 11, 1995

[54] METHOD AND APPARATUS FOR JOINING PANELS

[76] Inventor: Wayne C. Schwendeman, 504 Yorktown Rd., #31, Logansport, Ind. 46947

[21] Appl. No.: 92,603

[22] Filed: Jul. 16, 1993

[51] Int. Cl.$^6$ .............................................. E04C 1/04
[52] U.S. Cl. ................... 52/282.5; 52/282.2; 52/287.1; 52/290
[58] Field of Search ................ 52/282.1, 282.2, 282.3, 52/282.5, 287.1, 288.1, 290, 280; 403/391, 399, 406.1, DIG. 10

[56] References Cited

U.S. PATENT DOCUMENTS

| | | | |
|---|---|---|---|
| 855,195 | 5/1907 | Marr | 52/288.1 X |
| 1,605,597 | 11/1926 | Long | 52/282.5 X |
| 2,620,525 | 12/1952 | Ketchum | 52/288.1 X |
| 3,190,408 | 6/1965 | Petterson | 52/282.1 X |
| 3,323,819 | 6/1967 | Barker | 52/282.3 X |
| 3,695,649 | 10/1972 | Lavergne | 403/347 X |
| 4,120,130 | 10/1978 | Puschkarski | 52/282.5 |
| 4,470,234 | 9/1984 | Rosner | 52/282.5 X |
| 4,782,637 | 11/1988 | Eriksson | 52/280 |
| 4,840,440 | 6/1989 | Dieter | 52/282.4 X |
| 4,928,470 | 5/1990 | Perez | 52/280 X |

FOREIGN PATENT DOCUMENTS

597451  4/1978  Germany ........................... 52/282.5

*Primary Examiner*—Carl D. Friedman
*Assistant Examiner*—Beth A. Aubrey
*Attorney, Agent, or Firm*—Bush, Moseley, Riddle & Jackson

[57] ABSTRACT

A method and apparatus is provided for the joining of sheets or panels of material. Joint strips are provided having sheet or panel connection slots defined by spaced integral connection flanges or portions. The joint strip is also provided with a yieldable wall typically of concave or convex configuration which is moved by centrally oriented jack screws, bolts or by other force developing devices. As the yieldable wall is moved, force moments are imparted to yieldable connection flanges causing the connection flanges to close the connection slots to the extent that the sheets or panels are tightly and securely gripped along the edges thereof between the connection flanges and the strip base or between spaced flanges. The joint strips may be manufactured by extrusion from any suitable metal or non-metal material and may be actuated for both connection and releasing sheets or panels of material thus permitting them to be reusable.

22 Claims, 4 Drawing Sheets

METHOD AND APPARATUS FOR JOINING PANELS

FIELD OF THE INVENTION

This invention relates generally to the joining of panels of material such as metal sheets so as to define any of a number of structures including housings, containers, cabinetry or the like. More particularly, the present invention relates to a method and apparatus for joining panel components in planar relation in angular relation or in a multi-panel joint through utilization of joint strip members having connection slots for receiving the edges of the panels to be joined and which incorporate means for inducing closure of the connection slots for establishing a gripping relation of components of the joint strip member with the edges of adjacent panels.

BACKGROUND OF THE INVENTION

The term "panel" as used in this application is intended to encompass sheets of material such as metal, polymer or vitreous substances or other materials which can be compressed without substantial damage. This term is also intended to encompass multi-sheet structures which can be assembled at their edges to form various articles of manufacture. The term "sheet stock" is also intended to be encompassed within the term, "panel". Sheets or panels of material such as sheet metal are joined in many different ways to define articles of manufacture such as housings, containers, cabinetry etc. In the case of metal sheet material, joining is often accomplished by means of welding or by riveting overlapped edges or edges that are joined by suitable joint strips. Sheet stock is often joined by screws, bolts, rivets or the like to define objects of manufacture. In all of these cases however it is necessary to prepare the edges of the sheet stock for welding or to drill holes in the edges of the sheet stock to prepare it to receive rivets, bolts or screws. It is desirable to provide a system for joining the edges of sheet stock wherein the sheet stock needs no other preparation other than the formation of straight edges.

In most cases where sheet stock is prepared at its edges for the purpose of being joined, the edges are permanently altered for the joining process. If the sheet stock is disassembled and then reassembled, often the sheets must be further altered or reprepared for joining if tight joints are to be achieved and if a positively secured relationship is to be established between adjacent panels. It is desirable therefore to provide a system for joining panels of sheet stock wherein the edges of the sheet stock are not altered and therefore may be disassembled and reassembled at the joints as many times as desired without any significant alteration of the sheet stock.

In most cases panels of sheet stock are joined at the edges by means of mechanical interconnection with other sheet stock components of the article of manufacturer or by means of joint strips. It is desirable to provide a system for joining panels of sheet stock which achieves such joining by frictional retention to secure the sheet like panels in integrated assembly to thus define an article of manufacture.

SUMMARY OF THE INVENTION

It is a principle feature of the present invention to provide a novel method of joining panels of sheet stock at the respective edges thereof wherein frictional gripping is established between joint strips and the edges of the sheet stock to provide for secure retention of the sheet stock in a suitable assembly.

It is also a feature of this invention to provide a novel method of joining adjacent panels of sheet stock by achieving forcible yielding of joint strip material so as to close slots or receptacles thereof on an edge portion of the sheet stock material to thus retain the sheet stock material in positively retained assembly therewith.

It is an even further feature of this invention to provide a novel joint strip having flanged structure thereof for defining sheet or panel receiving slots or receptacles and wherein the joint strip material incorporates a portion subject to mechanically induced yielding which accomplishes closing actuation of at least one sheet retainer flange to thus establish a sure gripping relationship between the edges of the sheets or panels and the joint strip material.

Briefly, the various objects and features of the present invention are realized through the provision of joint strips composed of yieldable material such as aluminum and/or aluminum alloy, other suitable yieldable metals, polymer material or the like and which defines pairs of spaced, sheet or panel gripping surfaces, with the spaces therebetween defining sheet or panel receiving slots or receptacles, the structure defining at least one of the sheet or panel gripping surfaces of each pair of sheet or panel gripping surfaces being yieldable upon movement of the movable portion of the connecting strip, thus causing the panel gripping surfaces to mechanically grip the edge of the sheet or panel that is located therebetween.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments which become obvious upon an understanding of this invention.

In The Drawings.

DETAILED DESCRIPTION OF PREFERRED EMBODIMENT

Figure 1:
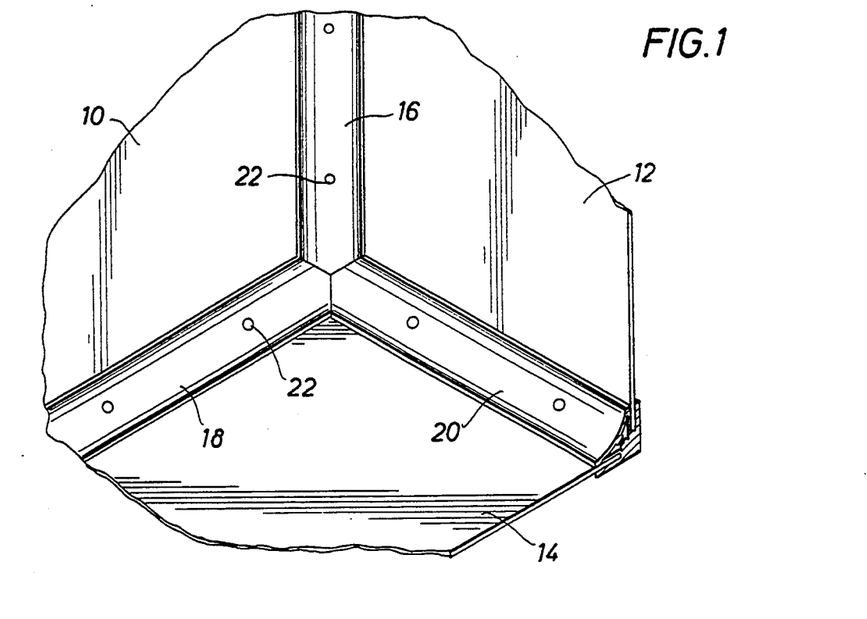
FIG. 1 is a pictorial representation of an interior corner section of an object having three sheets of material being joined in assembly by gripping joint strips constructed in accordance with the present invention.
Figure 2:
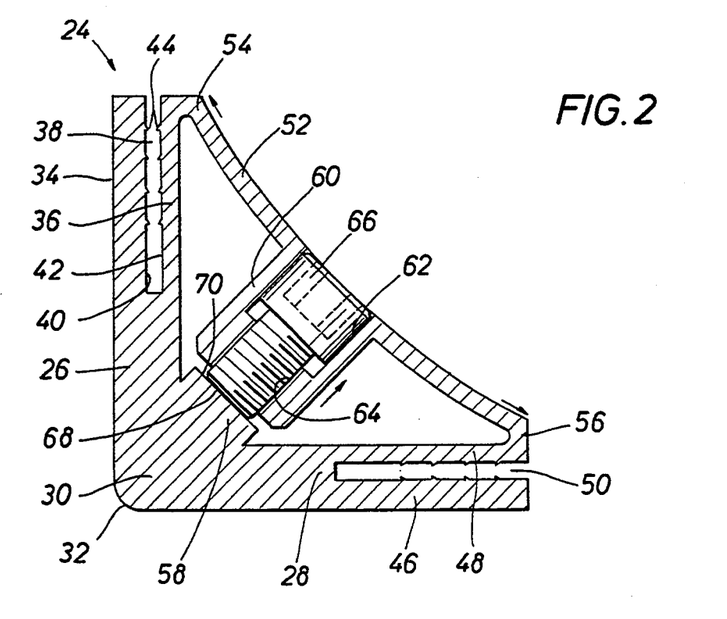
FIG. 2 is a cross-sectional illustration of a gripping joint strip as shown in FIG. 1 and being illustrated in the original, unyielded condition thereof.

Referring now to the drawings and first to FIG. 1, three sheets of material shown at 10, 12 and 14 are joined in such a manner as to form a corner by means of joint strips 16, 18 and 20. These joint strips establish compressive frictional retention with the edge portions of each of the sheets or panels 10–14 and thus secure the sheets or panels in secure, structurally sound, but releasable assembly. A plurality of screws or bolts 22 are utilized to achieve structural deformation of certain of the joint strip components in the manners described herein below particularly in connection with FIGS. 2 and 3 which illustrate the preferred embodiment by way of cross section. The connection strips which are shown generally at 24 define a pair of base members 26 and 28 which, as shown in FIG. 2, are oriented in 90° angulated relation and are integrally connected at 30 so as to define a strip corner 32. The base member 26 has a bifurcated side portion which defines a pair of outwardly directed integral connection flanges 34 and 36 which are disposed in space relation as to define a connection slot or elongate receptacle 38. The connection flanges 34 and 36 each define interior panel gripping surfaces 40 and 42 respectively which are each configured to establish a gripping relationship with a sheet or panel of material to be received within the connection slot. Surface preparation of the panel gripping surfaces 40 and 42 may conveniently take the form of ridges and grooves as shown at 44.

The opposite side of the base member or section 28 is also of bifurcated configuration and thus defines a pair of spaced integral flanges 46 and 48 of the same general configuration and purpose as flanges 34 and 36 and which cooperate to define a panel or sheet connection slot or receptacle 50.

Figure 3:
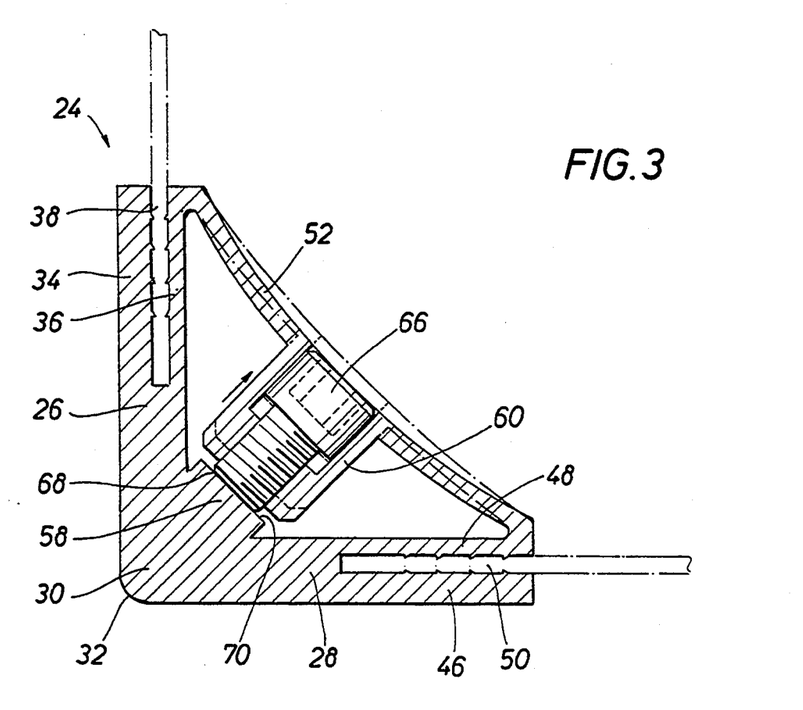
FIG. 3 is a cross-sectional illustration similar to that of FIG. 2 but showing the yielded condition of the gripping joint strip of this invention for achieving mechanically induced gripping of the edge portions of the sheets or panels.

The connection strip 24 includes an elongate deformable panel 52 which is integrally connected at its respective elongate sides 54 and 56 to the outermost portions of the yieldable sheet or panel connection flanges 36 and 48. This integral connection however may be established between the sides of the deformable panel and any suitable structural portion of the yieldable flange without departing from the spirit and scope of this invention. As shown in FIGS. 2 and 3 the deformable panel 52 is of concave configuration and extends along the entire length of the connection strip. It should be borne in mind that the deformable panel 52 may be of any other suitable configuration without departing from the spirit and scope of the present invention.

When a sheet or panel of material is placed within the respective connection slots 38 and 50, it is desirable to accomplish inward yielding of the internal connection flanges 36 and 48 so as to close the connection slots 38 and 50 and tightly clamp the sheets or panels within their respective connection slots, One suitable means for accomplishing closure of the connection slots 38 and 50 is to yield the interior yieldable connection flanges 36 and 48 toward the respective relatively unyieldable base flanges 34 and 46. This is accomplished by yielding the deformable panel 52 outwardly causing it, or a portion of it, to yield outwardly as shown in broken lines in FIG. 3 thus applying force to the respective outer extremities of the yieldable flanges 36 and 48 as shown by the force arrows. In accordance with the embodiment shown in FIGS. 2 and 3 mechanical outward yielding of the deformable panel 52 is caused by a mechanism disposed internally of the connection strip which operates to "jack" the central portion of the deformable panel 52 outwardly. One means for accomplishing this feature may conveniently take the form shown in FIGS. 2 and 3 where an internal structural rib 58 is defined integrally with the base members 26 and 28 and is generally oriented in a direction bisecting the angle between the base members. An internal structural rib 60 being separate from the rib 58 extends along the length of the deformable panel 52 and is located centrally thereof. The internal rib 60 is oppositely directed from the flange 58 so that its centerline is substantially coincident with that of the rib 58 and generally bisects the angle of the base members 26 and 28. At spaced locations along the length of the deformable panel 52, the structure of the panel and rib are machined to define a jack screw receptacle 62 and to define an internal threaded section 64. A jack screw device 66 which may conveniently take the form of a set screw as shown in FIGS. 2 and 3, is threaded into the opening 64 until its inner extremity 68 comes into contact with an angulated planar surface 70 that is defined by the rib 58. As the bolt or set screw 66 is then forcibly rotated, its threaded connection at 64 causes the inner end of the set screw to be forced tightly against the angulated planar reaction surface 70 of the rib 58. When this occurs the rib 60 is driven outwardly in the direction of the force arrows by the force of the set screw, thereby yielding the central portion of the deformable panel 52 outwardly in the direction of the centerline bisecting the angle between the base members 26 and 28. As this outward yielding movement of the deformable panel 52 occurs as shown in FIG. 3, the panel, being essentially yielded from its central portion outwardly at the locations of the bolts or set screws 66, will apply force outwardly as shown by the force arrows to the respective outer extremities of the yieldable flanges 36 and 48 as shown by reference numerals 54 and 56. When this occurs, the yieldable flanges 36 and 48 will be yielded in a direction toward the respective flanges 34 and 46, thereby closing the connection slots 38 and 50 and causing the respective internal gripping surfaces 40 and 42 to establish a secure gripping relationship with the respective sheet or panel that is located within each connection slot.

Although yielding of the internal connection flanges 36 and 48 in the manner discussed may accomplish some permanent deformation of the respective internal flanges, when the jacking force of the set screws is released, the flanges 36 and 48 will yield a significant extent toward the initial positions thereof. Such yielding will thereby open the respective connection slots 38 and 50 thereby releasing the gripping relationship of the interior flange surfaces 40 and 42 with the respective sheets or panels. The panels may then be removed and replaced as many times as desired. The edge portions of the panels will not be deformed or distorted to any significant extent. The connection strips 24 may thus be used again and again for establishing gripping relation with the edge portions of the respective sheets or panels so as to define an article of manufacture.

Figure 4:
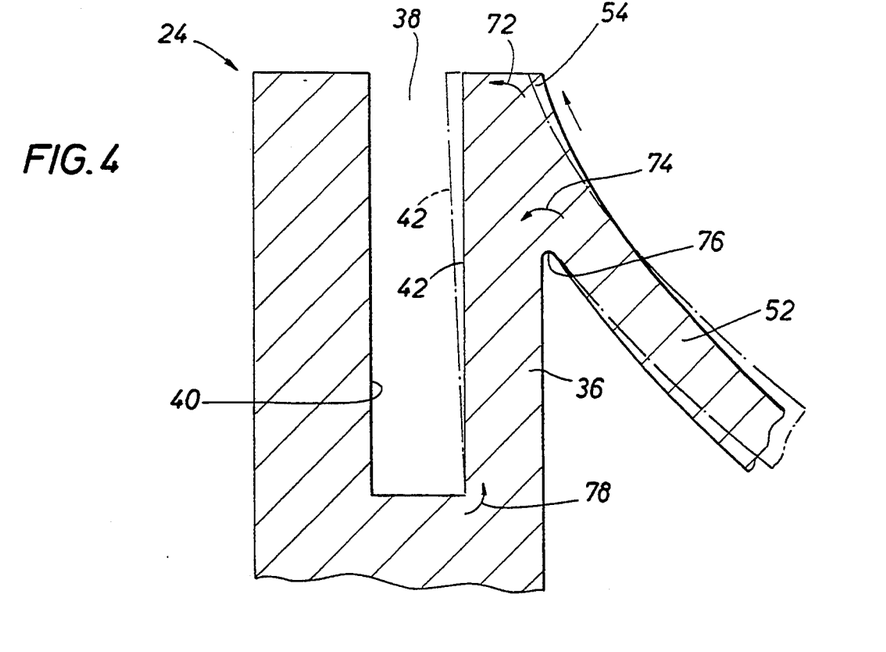
FIG. 4 is a fragmentary sectional view illustrating the upper portion of the sheet gripping strip joint material of FIG. 2, illustrating the original configuration thereof in full line and showing the yielded condition thereof by way of broken line.

Referring now to FIG. 4 an enlarged fragmentary sectional view of the upper portion of the connection strip 24 is shown which includes force arrows to describe yielding of the deformable panel 52 and the yieldable flange 36. As the central portion of the flange 52 is yielded outwardly as shown by the broken lines it develops an outward force that by virtue of its integral connection 54 is applied to the upper or outer portion of the yieldable flange 36. Simultaneously this outward movement of the deformable panel 52 induces a moment of force shown by the force arrow 72 which is directed laterally on the flange 36 by virtue of the angulated connection of the yieldable panel 52 with an intermediate portion of the flange 36 by virtue of the angulated connection shown at 76. Through application of force moments 72 and 74 to the upper portion of the flange structure 36 the lower portion of the flange is yielded in a manner shown by force moment 78. These combined force moments cause the yieldable flange 36 to assume the position shown in broken line in FIG. 4, thereby closing the connection slot 38 and causing the opposed gripping surfaces 40 and 42 to establish gripping relation with the edge of the sheet or panel that is located within the connection slot.

Figure 5:
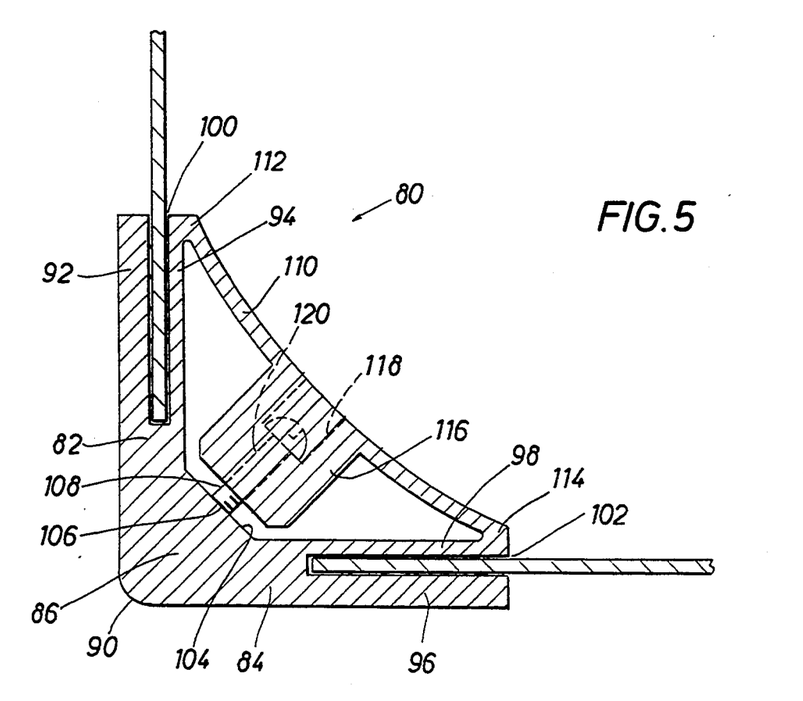
FIG. 5 is a sectional view illustrating an alternative embodiment of the present invention and showing sheets or panels oriented at 90° relation with one another and having the edges thereof being positioned within respective gripping slots or receptacles of the joint strip material hereof.

As illustrated in FIG. 5 an alternative embodiment of the invention is illustrated generally at 80 and includes base members 82 and 84 which are disposed in 90° angular relation similarly as set forth in FIGS. 2 and 3 and being integrally connected at 86 so as to define a corner 90. The base members 82 and 84 respectively are bifurcated at the outer extent thereof and define pairs of spaced integral flanges 92–94 and 96–98 which cooperate to define respective connection slots 100 and 102.

The structure of the embodiment shown in FIG. 5 differs from that shown in FIGS. 2 and 3 essentially in the lack of one internal rib. As shown the base members 82 and 84 are interconnected by an internal angulated location surface 104 which is oriented in substantially normal relation with a line bisecting the angle of the base members. The angulated surface 104 defines a reaction surface for engagement by the inner extremity 106 of a screw member 108. A yieldable panel 110, which extends the entire length of the connection strip, is integrally connected at its edges 112 and 114 to the outer portions of the yieldable flanges 94 and 98. An internal rib 116 is formed integrally with the yieldable panel 110 and preferably extends along its entire length. The rib 116 is machined such as by drilling and tapping at desired locations along its length so as to define screw receptacles shown in broken line at 118 and internally threaded screw holes as shown in broken line at 120.

Although angular orientation of the sheets or panels are shown to be connected by the connection strip of FIGS. 1–5, such is not intended to be limiting of the spirit and scope of the present invention. As shown particularly in FIG. 6, a connection strip manufactured in accordance with the present invention and illustrated generally at 122, is shown to connect opposed panels or sheets 124 and 126 in substantially co-planar relation. The connection strip 122, illustrated in cross-section in FIG. 6, defines a relatively thick base section 128 having considerable structural integrity. A pair of yieldable flanges 130 and 132 being formed integrally with the base section 128 cooperate with the base section to define opposed connection slots 134 and 136. The connection strip includes a pair of side walls 138 and 140 which are integral with the respective flanges 130 and 132 and which are disposed in substantially normal relation with the yieldable flanges. A yieldable panel 142 having a curved cross-sectional configuration as shown has its opposed sides connected integrally with the respective side walls 138 and 140. The connection strip is also defined at certain locations along its length to form screw or bolt receptacles 144 and threaded openings 146 for receiving screws or bolts 148. Screws or bolts are threaded into the openings 146 and are rotated to bring their respective inner extremities into forcible engagement with the central portions of the curved yieldable panel 142. As the screws or bolts are further rotated the central portion of the yieldable panel is driven away from the base section 128 and thus applies force moments to the opposed transverse walls 138 and 140. These forced moments are translated by the walls 138 and 140 to the respective flanges 130 and 132 thereby causing inward yielding of the flanges to thus accomplish closure of the respective connection slots for gripping of the sheets or panels between the yieldable flanges and the interior slot surfaces of the base member 128.

Figure 7:
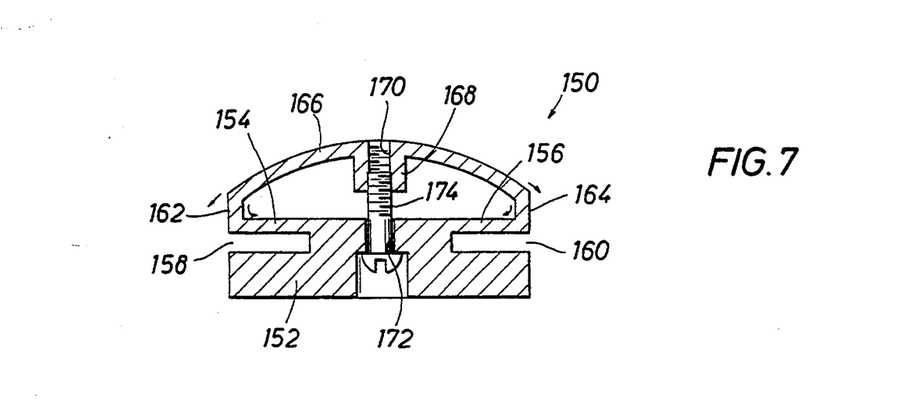
FIG. 7 is a sectional view of a further alternative embodiment of this invention including a convexly configured yieldable panel for achieving slot or receptacle closure.

Another alternative embodiment of the present invention is illustrated generally at 150 in FIG. 7 and incorporates, as illustrated by way of cross section, a base structure 152 having integral yieldable flanges 154 and 156 which cooperate with the base section to define opposed panel or sheet connection slots 158 and 160. To the respective outer portions of the flanges 154 and 156 are integrally connected force translating side walls 162 and 164. A convexly configured yieldable panel 166 is shown having an internal structural rib 168 extending along the internal length thereof. The yieldable panel 166 and its internal rib 168 are machined to define a plurality of spaced internally threaded openings 170 along the length thereof. The base structure defines a plurality of corresponding non-threaded openings 172 for receiving bolts or screws 174. As each of the bolts or screws are rotated they cause a centrally located internal rib 168 to be yielded inwardly at the central portion thereof, thereby also causing the central portion of the yieldable panel 166 to be yielded inwardly. Inward yielding of the central portion of the yieldable panel 166 causes its outer edges to be moved outwardly thereby applying moments of force to the upper portions of the opposed laterally extending walls 162 and 164. These walls are essentially pivoted about their respective points of connection with the outer portions of the yieldable internal flanges 154 and 166 as is also depicted by force arrows. These combined force moments act on the yieldable flanges 154 and 156 thereby causing them to be yielded toward the base structure 152 thereby closing the respective connection slots 158 and 160 and causing frictional retention of the panels or sheets having edge portions disposed therein.

Figure 8:
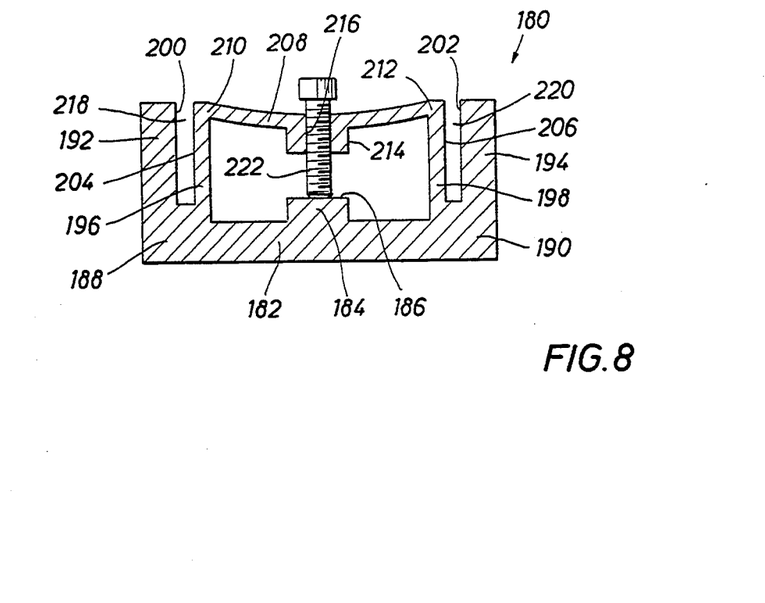
FIG. 8 is a cross-sectional illustration of a further embodiment of the present invention which provides for effective joining of panels disposed in parallel relation.

Referring now to FIG. 8, a further alternative embodiment of the present invention is illustrated in cross-section generally at 180 and includes a base wall structure 182 having a centrally oriented structural rib 184 projecting inwardly therefrom and defining an elongate, relatively narrow reaction surface 186. Opposed side portions 188 and 190 of the generally rectangular strip connector 180 are each bifurcated so as to define a pair of base flanges 192 and 194 and a pair of yieldable internal flanges 196 and 198. The base flanges 192 and 194 are of generally rigid character while the internal flanges 196 and 198 are quite yieldable in comparison. The more rigid base flanges 192 and 194 define internal gripping surfaces 200 and 202 which are disposed in spaced, generally parallel relation with respect to internal gripping surfaces 204 and 206 which are defined by the yieldable flanges. A deformable wall structure 208 is integrally connected at its opposed edges 210 and 212 with the outer portions of the flexible flanges 196 and 198 respectively. The deformable wall 208 is of concave configuration and is provided with an inwardly projecting structural rib 214 which extends substantially entirely along the length of the connection strip. The structure rib 214 is machined at spaced locations along its length, along with the deformable wall 208, so as to define a plurality of spaced internally threaded openings that are located centrally and along the length of the yieldable wall 208.

For inward yielding of the flexible flanges 196 and 198 toward the gripping surfaces 200 and 202 of the base flanges 192 and 194 to achieve closure of the connection slots 218 and 220 a plurality of bolts 222 are threaded through the openings 216 so that the respective inner extremities thereof are caused to bear against the reaction surface 186 of the internal rib 184. After the end of the bolt has come into contact with the reaction surface, further rotation of the bolt will, by virtue of its threaded connection at the bolt openings 216, cause outward deflection of the central portion of the yieldable wall 208. When this occurs, force moments are transmitted via edge connections 210 and 212 to the upper extent of the respective flexible flanges 196 and 198. These force moments cause inward bending of the flexible flanges thus causing gripping surfaces 204 and 206 to move toward gripping surfaces 200 and 202, thereby tightly gripping the edge portions of any sheet or panel structure that are located within the respective connection slots 218 and 220.

Figure 6:
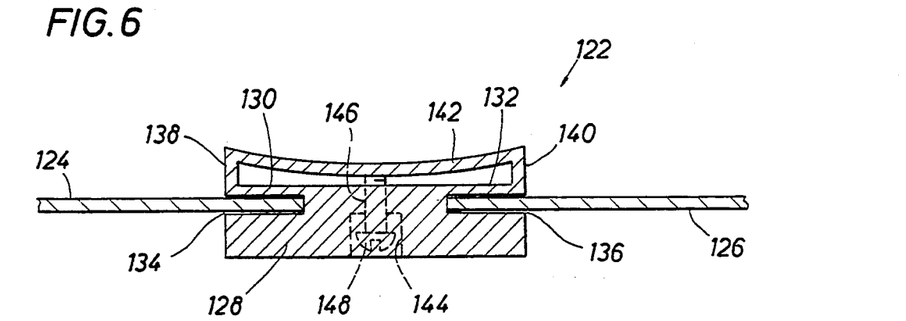
FIG. 6 is a sectional view of a further alternative embodiment of the present invention, illustrating sheets or panels to be joined being oriented in co-planar relation and having edge portions thereof located within respective gripping slots or receptacles of the joint strip material hereof.

The joint connection structure of FIG. 8 permits sheets or panels to be connected in substantially parallel orientation as compared with angulated orientation as shown in FIG. 2 or co-planar orientation as shown in FIGS. 6 and 7.

Figure 9:
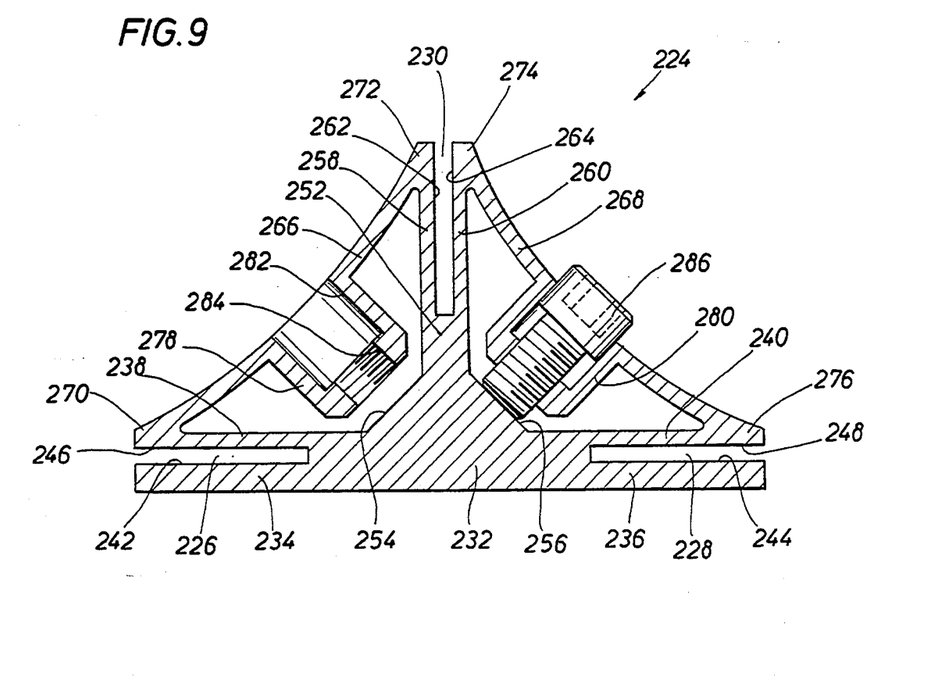
FIG. 9 is a cross-sectional illustration of another embodiment of this invention which illustrates interconnection of multiple sheets or panels which are arranged to define a joint of "T-shaped" configuration.

Referring now to FIG. 9 it is possible to employ the concept of the present invention in the connection of panel members so as to define a "T-shaped" joint between the panels. This feature is accomplished by providing an elongate joint strip such as is illustrated generally at 224 and which defines connection slots 226 and 228 for connecting adjacent sheets or panels in substantially co-planar orientation and a slot 230 which is oriented in substantially normal relation with the plane of the slots 226 and 228. This is accomplished by providing an elongate connection strip having a base structure 232 extending substantially along its entire length and which has opposed bifurcated portions defining oppositely directed base flanges 234 and 236 and yieldable flanges 238 and 240. The base flanges define gripping surfaces 242 and 244 while the flexible flanges define substantially planar gripping surfaces 246 and 248.

At its central portion the base structure 232 of the connection strip 224 defines a T connection structure 252 which is oriented in substantially normal relation with the plane of the opposed connection slots 226 and 228. At its central portion the base structure 232 also defines a pair of angulated reaction surfaces 254 and 256 which are each oriented in substantially normal relation with an axis bisecting the angle of centerlines of the T connection structure 252 and the base wall structure 232. These reaction surfaces 254 and 256 are oriented at substantially a 45° relation with the structural wall of the T connection structure and the base wall of the opposed bifurcated wall sections of the base structure. The reaction surfaces 254 and 256 may be of any other suitable angular orientation that suits the intended purpose of the invention.

The T connection wall structure 252 is bifurcated at its outer extent so as to define a pair of generally parallel, spaced, flexible flanges 258 and 260 which define generally parallel internal gripping surfaces 262 and 264. These gripping surfaces, as with other gripping surfaces of the connection strip 224, may be provided with tooth-like ridges and grooves so as to establish an efficient gripping relation with the edge of the panel structure that is located within the groove 230.

A pair of yieldable walls of concave cross-sectional configuration are provided as shown at 266 and 268 having respective edge portions 270-272 and 274-276 that are connected integrally with the outer extent of the respective flexible flanges of the joint strip 224. The yieldable concave panels 266 and 268 are also provided with respective inwardly projecting structural ribs 278 and 280 which preferably extend the entire length of the connection strip. As shown at the left side of FIG. 9, the ribs 278 and 280 are machined at spaced locations along the length thereof, along with the respective yieldable panels 266 and 268 so as to define internal bolt receptacles and internally threaded bolt openings such as shown at 282 and 284. These bolt openings each receive the threaded portion of bolts or set screws such as shown at 286 which extend through the bolt holes and into contact with the respective internal reaction surfaces 254 and 256 such as shown at the fight side portion of FIG. 9. As the bolts or set screws are rotated from the position shown in FIG. 9, the resistance of the reaction surfaces causes the structural ribs 280 to be moved outwardly thereby flexing the concave yieldable wall structure 268 outwardly so that the respective edges 274 and 276 of the yieldable walls are driven away from one another. The integral connection of these edges with the respective flexible flanges 260 and 240 thus causes the flanges to be yielded in a direction causing closure of the respective connection slots thereby causing the opposed gripping surfaces of the flanges forming the connection slots to be driven into tightly engaged retaining relation with respect to the edge portion of the sheets or panels thereby securing them in integral assembly to form a suitable article of manufacture.

The connection strips, whether taking the form shown in FIGS. 2 and 3, the form shown in FIG. 6 or the form shown in FIGS. 7-9 may be manufactured by extrusion from a yieldable metal such as aluminum, any one of a number of aluminum alloys or other metals. The connection strips may also be composed of a non-metal material such as any one of a number of suitable polymer materials.

Since certain changes or modifications may be made in the disclosed embodiments without departing from the inventive concepts involved, it is the aim of the appended claims to cover all such changes and modifications falling within the true spirit and scope of the present invention.

What is claimed is:

1. A method for joining of panels along the edges thereof by means of compression retention, comprising:
    (a) providing a connection strip having structural members defining at least two connection slots for receiving edges of panels to be joined, at least one of said structural members of each connection slot being yieldable, said connection strip further having a deformable wall having opposed edges and being disposed in force transmitting relation with respective yieldable structural members;
    (b) inducing yielding movement of at least an intermediate portion of said deformable wall in a direction transverse to said opposed edges of said deformable wall thus causing movement of said opposed edges of said deformable wall away from one another; and
    (c) with said opposed edges of said deformable wall, applying moments of force to at least one of said yieldable structural members, said moments of force yielding said at least one yieldable structural member in a direction for moving said yieldable structural member into compressive frictional retention with said edges of said panels thus securing said panels in assembly.

2. The method of claim 1, wherein said yieldable structural members are defined by opposed yieldable flanges having integral connection with respective opposed edges of said deformable wall, said method further comprising:
    translating movement of said opposed edges of said deformable wall through said integral connections thereof with said yieldable flanges thus imparting clamping movement to said yieldable flanges for securing said edges of said panels within said connection slots.

3. The method of claim 1, wherein said connection strip includes a strip base having said yieldable flanges disposed in integral relation therewith and cooperating therewith to define said connection slots, said method further comprising:
    with said opposed edges of said deformable wall, applying moments of force to said yieldable flanges, thus moving said yieldable flanges toward said strip base and clamping said panels between said strip base and said yieldable flanges.

4. The method of claim 1, wherein said deformable wall is of generally curved cross-sectional configuration and defines opposed edges extending substantially the length thereof, said structural members being defined by a strip base and by yieldable flanges extending from said strip base and being spaced from portions of said strip base, said method further comprising:
    (a) moving at least a portion of said deformable wall in a direction causing movement of said opposed edges of said deformable wall away from one another; and
    (b) by said opposed edges of said deformable wall imparting moments of force to said yieldable flanges thus moving at least a portion of each of said yieldable flanges toward said strip base and gripping said panel between said strip base and said yieldable flanges.

5. A connection strip for connecting the edge portions of adjacent panels of substantially rigid material, comprising:
    (a) a strip base structure defining a first pair of panel gripping surfaces and defining first reaction means;
    (b) a pair of yieldable flanges being connected with said strip base structure, each of said yieldable flanges defining a second panel gripping surface disposed in opposed spaced relation with respective first panel gripping surfaces of said strip base structure;
    (c) a deformable wall defining second reaction means and having opposed edges each being in force transmitting relation with respective yieldable flanges; and
    (d) actuator means engagable with said first and second reaction means for inducing movement of selected portions of said deformable wall in a direction moving said opposed edges relative to one another and inducing yielding movement of said yieldable flanges causing movement of said second panel gripping surfaces toward respective first panel gripping surfaces and thus establishing gripping of the edge portion of adjacent panels between respective first and second material gripping surfaces.

6. The connection strip of claim 5, wherein:
    said opposed edges of said deformable wall are integrally connected to said yieldable flanges.

7. The connection strip of claim 5, wherein:
    (a) said deformable wall is of curved cross-sectional configuration and said opposed edges thereof are disposed in parallel relation and extend substantially the length of said connection strip; and
    (b) said yieldable flanges extending substantially the length of said connection strip and being integrally connected at the outer extremities thereof with said opposed edges of said deformable wall.

8. The connection strip of claim 5, wherein:
    (a) said first reaction means is a reaction surface defined by said base strip;
    (b) said second reaction means being a plurality of threaded openings being defined in spaced relation along the length of said deformable wall; and
    (c) said actuator means being a plurality of threaded members received respectively by said threaded openings and being rotatable for engaging said reaction surface and forcibly moving portions of said deformable wall away from said reaction surface.

9. The connection strip of claim 5, wherein:
    (a) said first reaction means being a reaction surface defined by said base strip and extending along the length thereof;
    (b) a rib element projecting interiorly of said connection strip from said deformable wall and extending substantially the length of said deformable wall, said rib element being disposed in opposed relation with said reaction surface and having said plurality of threaded openings defined along the length thereof; and
    (c) said actuator means being a plurality of threaded members received respectively by said threaded openings and being rotatable for forcibly moving portions of said deformable wall relative to said reaction surface.

10. The connection strip of claim 5, wherein:
said deformable wall is of concave cross-sectional configuration.

11. The connection strip of claim 5, wherein:
said deformable wall is of convex cross-sectional configuration.

12. The connection strip of claim 5, further comprising:
   (a) a first internal rib being defined by said base strip and extending substantially the length thereof, said first internal rib defining said first reaction surface;
   (b) a second internal rib being formed integrally with said deformable wall and extending substantially the length thereof, said second internal rib being located substantially centrally of said deformable wall and projecting toward said first internal rib, said second internal rib having a plurality of threaded openings disposed in spaced relation along the length thereof; and
   (c) said means for inducing movement of selected portions of said deformable wall being a plurality of threaded members received by said threaded openings and engagable with said first reaction surface, said threaded members being rotatable for inducing selective movement of said selected portions of said deformable wall for simultaneous directionally controlled yielding movement of said yieldable flanges.

13. A connection strip for connecting the edge portions of adjacent panels of substantially rigid material, comprising:
   (a) a strip base structure defining a plurality of first panel gripping surfaces extending substantially along the length thereof, said strip base structure further defining first reaction means;
   (b) a plurality of yieldable flanges being integrally connected with said strip base structure, each of said yieldable flanges defining a second panel gripping surface disposed in opposition with respective first panel gripping surfaces of said strip base structure and extending substantially along the length thereof;
   (c) a deformable wall defining opposed edges each being integrally connected in force transmitting relation with respective yieldable flanges, said deformable wall defining second reaction means; and
   (d) actuator means for inducing relative movement of said first and second reaction means for thus causing movement of selected portions of said deformable wall in a direction moving said opposed edges away from one another and inducing movement of said yieldable flanges for movement of said second panel gripping surfaces thereof toward respective first panel gripping surfaces thus establishing gripping of the edge portions of panels located between said first and second panel gripping surfaces.

14. The connection strip of claim 13, wherein:
   (a) said deformable wall is of substantially curved cross-sectional configuration and said opposed edges thereof extend substantially the length of said connection strip; and
   (b) said yieldable flanges extending substantially the length of said connection strip and being integrally connected with said opposed edges of said deformable wall.

15. The connection strip of claim 14, wherein:
   (a) said first reaction means is a reaction surface defined by said strip base;
   (b) said second reaction means being a plurality of threaded openings defined in spaced relation along the length of said deformable wall; and
   (c) said actuator means being a plurality of threaded members received respectively by said threaded openings and being rotatable for engagement with said reaction surface and for forcibly moving portions of said deformable wall in a direction away from said reaction surface.

16. The connection strip of claim 14, wherein:
   (a) said first reaction means being a reaction surface defined by said base strip and extending along the length thereof;
   (b) a rib element projecting interiorly of said connection strip from said deformable wall and extending substantially the length of said deformable wall, said rib element being disposed in opposed relation with said reaction surface and having said plurality of threaded openings defined along the length thereof; and
   (c) said actuator means being a plurality of threaded members received respectively by said threaded openings and being rotatable for forcibly moving portions of said deformable wall in a direction away from said reaction surface.

17. The connection strip of claim 13, wherein:
said yieldable wall is of concave cross-sectional configuration.

18. The connection strip of claim 13, wherein:
said yieldable wall is of convex cross-sectional configuration.

19. The connection strip of claim 13, including:
   (a) a first internal rib being defined by said base strip and extending substantially the length thereof, said first internal rib defining said first reaction surface;
   (b) a second internal rib being formed integrally with said deformable wall and extending substantially the length thereof, said second internal rib being located substantially centrally of said deformable wall and projecting toward said first internal rib, said second internal rib having a plurality of threaded openings disposed in spaced relation along the length thereof; and
   (c) said means for inducing movement of selected portions of said deformable wall being a plurality of threaded members received by said threaded openings and engagable with said first reaction surface, said threaded members being rotatable for inducing selective movement of said selected portions of said deformable wall for simultaneous directionally controlled yielding movement of said yieldable flanges.

20. A connection strip for connection with the edge of a panel, comprising:
   (a) a strip base defining first reaction means and having a first panel gripping surface;
   (b) a movable wall being connected with said strip base and defining second reaction means and having a second panel gripping surface disposed in spaced relation with said first panel gripping surface and defining a panel receiving slot therebetween; and
   (c) actuator means engagable with said first and second reaction means for moving said movable wall relative to said strip base and causing movement of said second panel gripping surface for gripping said edge of said panel therebetween.

21. The connection strip of claim 20, wherein:

said movable wall being in integral connection with said base strip.

22. The connection strip of claim 20, wherein:

(a) said first reaction means being a reaction structure defined by said base strip;

(b) said second reaction means being a reaction structure defined by said movable wall; and (c) said actuator means being engagable with said first and second reaction means and causing relative movement of said movable wall and said base strip for gripping of said edge of said panel between said first and second panel gripping surfaces.

* * * * *